US012682482B2

(12) United States Patent
Lu et al.

(10) Patent No.: US 12,682,482 B2
(45) Date of Patent: Jul. 14, 2026

(54) METHOD AND SYSTEM OF AUTOMATICALLY ESTIMATING A BALL CARRIER IN TEAM SPORTS

(71) Applicant: Intel Corporation, Santa Clara, CA (US)

(72) Inventors: Ming Lu, Beijing (CN); Liwei Liao, Beijing (CN); Haihua Lin, Beijing (CN); Xiaofeng Tong, Beijing (CN); Wenlong Li, Beijing (CN); Jiansheng Chen, Beijing (CN); Yiwei He, Beijing (CN)

(73) Assignee: Intel Corporation, Santa Clara, CA (US)

( * ) Notice: Subject to any disclaimer, the term of this patent is extended or adjusted under 35 U.S.C. 154(b) by 344 days.

(21) Appl. No.: 18/283,414

(22) PCT Filed: Jun. 16, 2021

(86) PCT No.: PCT/CN2021/100295
§ 371 (c)(1),
(2) Date: Sep. 21, 2023

(87) PCT Pub. No.: WO2022/261848
PCT Pub. Date: Dec. 22, 2022

(65) Prior Publication Data
US 2024/0119625 A1 Apr. 11, 2024

(51) Int. Cl.
*G06K 9/00* (2022.01)
*G06T 7/73* (2017.01)
*G06V 20/40* (2022.01)

(52) U.S. Cl.
CPC ............... *G06T 7/73* (2017.01); *G06V 20/42* (2022.01); *G06T 2207/20084* (2013.01); *G06T*
*2207/30196* (2013.01); *G06T 2207/30224* (2013.01); *G06T 2207/30242* (2013.01)

(58) Field of Classification Search
CPC ............. G06T 7/73; G06T 2207/20084; G06T 2207/30196; G06T 2207/30224; G06T 2207/30242; G06T 2207/30221; G06V 20/42; G06V 10/82; G06V 20/46; G06V 20/64; G06V 40/23; A63B 24/0021; A63B 2220/806
See application file for complete search history.

(56) References Cited

U.S. PATENT DOCUMENTS

| | | | | |
|---|---|---|---|---|
| 2018/0189971 A1* | 7/2018 | Hildreth | .................... | G06T 7/13 |
| 2020/0043287 A1* | 2/2020 | Zhang | .................... | G06V 20/52 |
| 2021/0064880 A1* | 3/2021 | Zhang | ..................... | G06T 7/90 |

FOREIGN PATENT DOCUMENTS

| | | |
|---|---|---|
| CN | 105844697 | 8/2016 |
| KR | 102211480 | 2/2021 |

OTHER PUBLICATIONS

Yoon, Young, et al. "Analyzing basketball movements and pass relationships using realtime object tracking techniques based on deep learning." IEEE Access 7 (2019): 56564-56576. (Year: 2019).*

(Continued)

*Primary Examiner* — Gregory A Morse
*Assistant Examiner* — Owais I Memon
(74) *Attorney, Agent, or Firm* — Hanley, Flight & Zimmerman, LLC

(57) ABSTRACT

A method and system of automatically estimating a ball carrier in team sports.

16 Claims, 14 Drawing Sheets

(56) References Cited

OTHER PUBLICATIONS

International Search Report and Written Opinion for PCT Application No. PCT/CN2021/100295, dated Mar. 3, 2022.
International Searching Authority, "International Preliminary Report on Patentability," issued in connection with International Patent Application No. PCT/CN2021/100295, mailed on Dec. 28, 2023, 6 pages.

* cited by examiner

Figure 5:
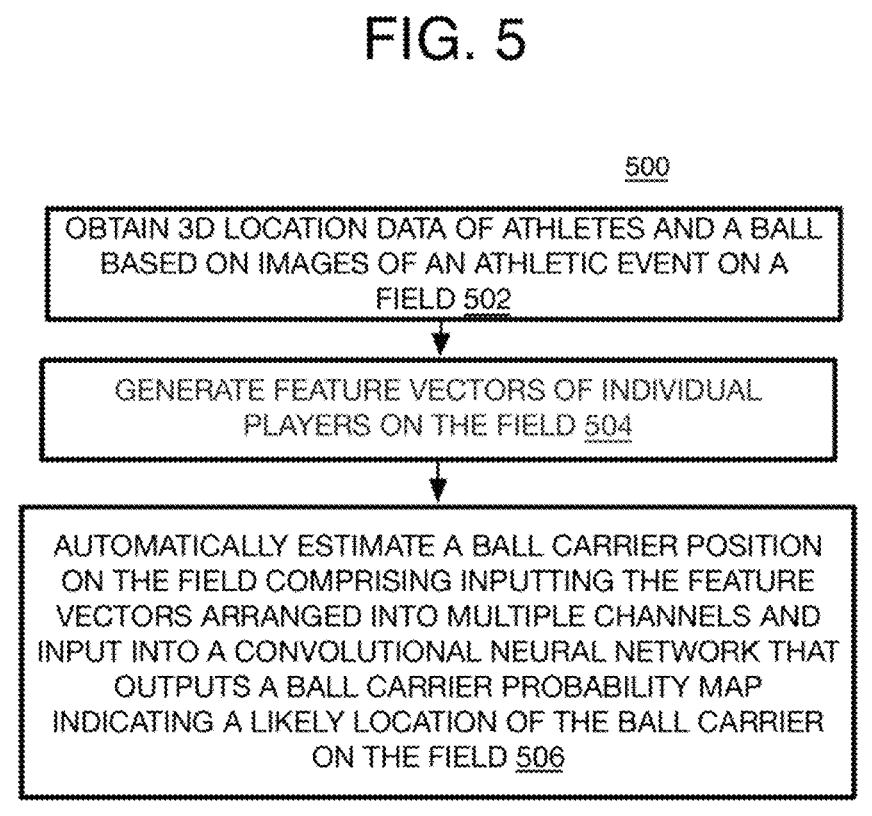

OBTAIN 3D LOCATION DATA OF ATHLETES AND A BALL
BASED ON IMAGES OF AN ATHLETIC EVENT ON A
FIELD 502

GENERATE FEATURE VECTORS OF INDIVIDUAL
PLAYERS ON THE FIELD 504

AUTOMATICALLY ESTIMATE A BALL CARRIER POSITION
ON THE FIELD COMPRISING INPUTTING THE FEATURE
VECTORS ARRANGED INTO MULTIPLE CHANNELS AND
INPUT INTO A CONVOLUTIONAL NEURAL NETWORK THAT
OUTPUTS A BALL CARRIER PROBABILITY MAP
INDICATING A LIKELY LOCATION OF THE BALL CARRIER
ON THE FIELD 506

| id | position | jersey | team | velocity | bodyOrientation |
|----|----------|--------|------|----------|-----------------|
| 882 | [-65.574, 10.467, 284.292] | 88 | 2 | 3.594 | [-0.939, -0.306] |
| 852 | [-2.708, 10.252, 228.623] | 85 | 2 | 2.515 | [-0.421, -0.833] |
| 762 | [-53.796, 11.047, 193.293] | 76 | 2 | 5.622 | [-0.799, -0.599] |
| 712 | [22.281, 11.295, 192.394] | 71 | 2 | 3.05 | [-0.421, -0.904] |
| 772 | [47.113, 8.657, 256.556] | 77 | 2 | 1.608 | [-0.337, -0.702] |
| 102 | [-52.559, 11.064, 334.403] | 10 | 2 | 2.144 | [0.151, -0.97] |
| 782 | [34.723, 10.974, 190.265] | 78 | 2 | 3.477 | [-0.392, -0.919] |
| 632 | [55.346, 11.796, 289.723] | 63 | 2 | 1.81 | [-0.532, -0.616] |
| 872 | [-41.812, 10.715, 218.634] | 87 | 2 | 3.601 | [-0.496, -0.868] |
| 252 | [-117.493, 9.498, 105.095] | 26 | 2 | 9.037 | [-0.462, -0.887] |
| 182 | [8.981, 10.251, 113.9] | 18 | 2 | 7.392 | [-0.542, -0.84] |
| 241 | [-3.824, 10.524, 90.836] | 24 | 1 | 7.728 | [-0.554, -0.832] |
| 911 | [12.119, 11.639, 278.382] | 91 | 1 | 3.47 | [-0.512, -0.855] |
| 921 | [29.395, 11.518, 162.166] | 92 | 1 | 5.487 | [-0.407, -0.913] |
| 971 | [33.838, 11.243, 247.937] | 97 | 1 | 0.81 | [0.993, -0.116] |
| 031 | [-26.856, 11.356, 161.46] | 03 | 1 | 5.462 | [-0.336, -0.94] |
| 941 | [-61.199, 11.11, 238.325] | 94 | 1 | 4.302 | [-0.38, -0.925] |
| 361 | [-68.185, 9.726, 216.413] | 36 | 1 | 5.347 | [-0.513, -0.857] |
| 541 | [-17.845, 10.813, 256.126] | 54 | 1 | 2.878 | [-0.982, -0.038] |
| 511 | [-6.024, 10.945, 123.889] | 51 | 1 | 6.779 | [-0.464, -0.885] |
| 311 | [-21.757, 10.311, 205.136] | 31 | 1 | 5.006 | [-0.686, -0.727] |
| 201 | [-87.073, 9.379, 94.411] | 20 | 1 | 7.34 | [-0.629, -0.775] |

| frame id | position |
|---|---|
| 280 | [128.317,14.418,-32.836] |
| 281 | [129.672,14.401,-33.395] |
| 282 | [130.325,14.168,-32.642] |
| 283 | [131.051,14.099,-32.593] |
| 284 | [131.513,13.928,-32.231] |
| 285 | [-1000.000,-1000.000,-1000.000] |
| 286 | [-1000.000,-1000.000,-1000.000] |
| 287 | [-1000.000,-1000.000,-1000.000] |
| 288 | [-1000.000,-1000.000,-1000.000] |
| 289 | [-1000.000,-1000.000,-1000.000] |
| 290 | [-1000.000,-1000.000,-1000.000] |

FIG. 10

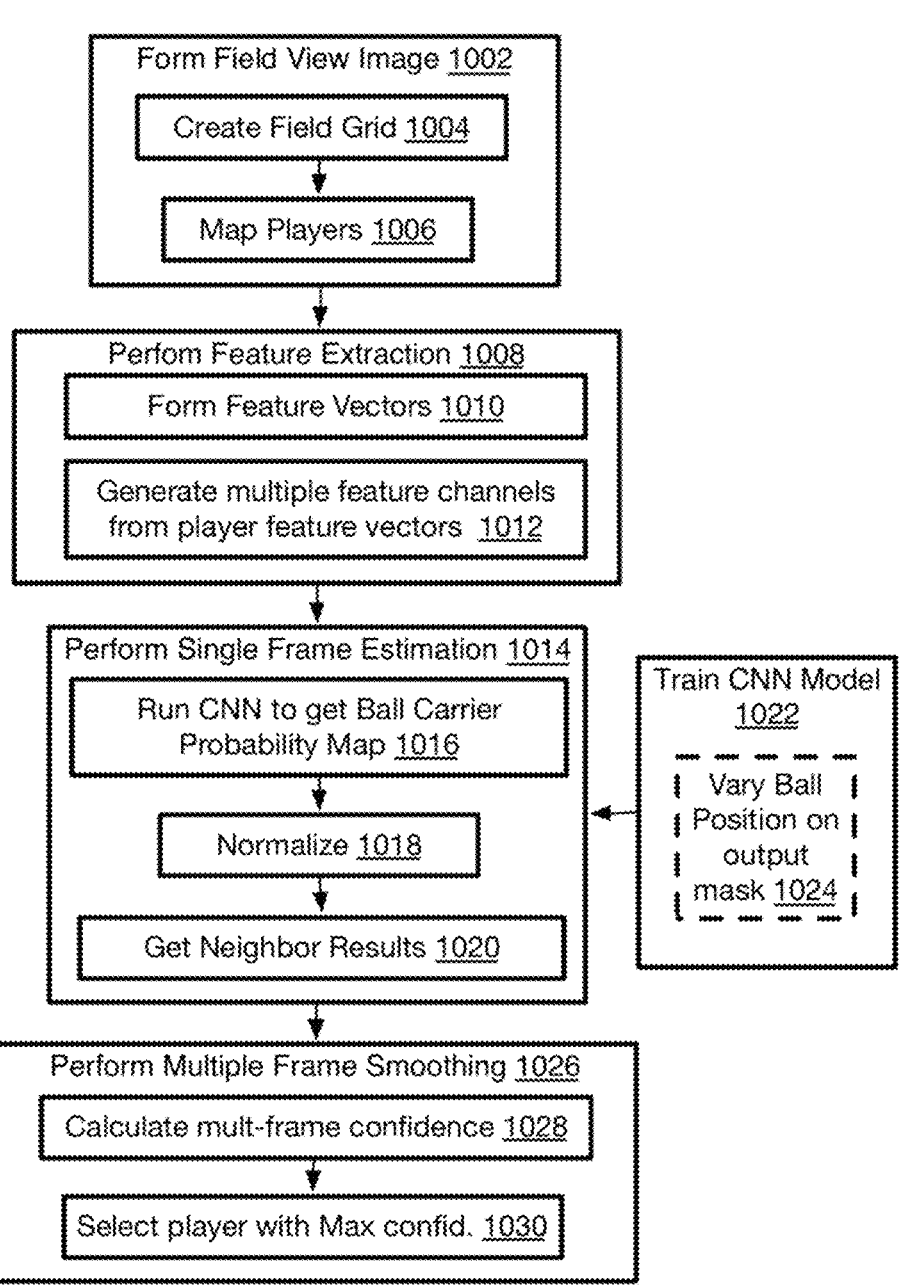

1000

Form Field View Image 1002

Create Field Grid 1004

Map Players 1006

Perfom Feature Extraction 1008

Form Feature Vectors 1010

Generate multiple feature channels from player feature vectors 1012

Perform Single Frame Estimation 1014

Run CNN to get Ball Carrier Probability Map 1016

Normalize 1018

Get Neighbor Results 1020

Train CNN Model 1022

Vary Ball Position on output mask 1024

Perform Multiple Frame Smoothing 1026

Calculate mult-frame confidence 1028

Select player with Max confid. 1030

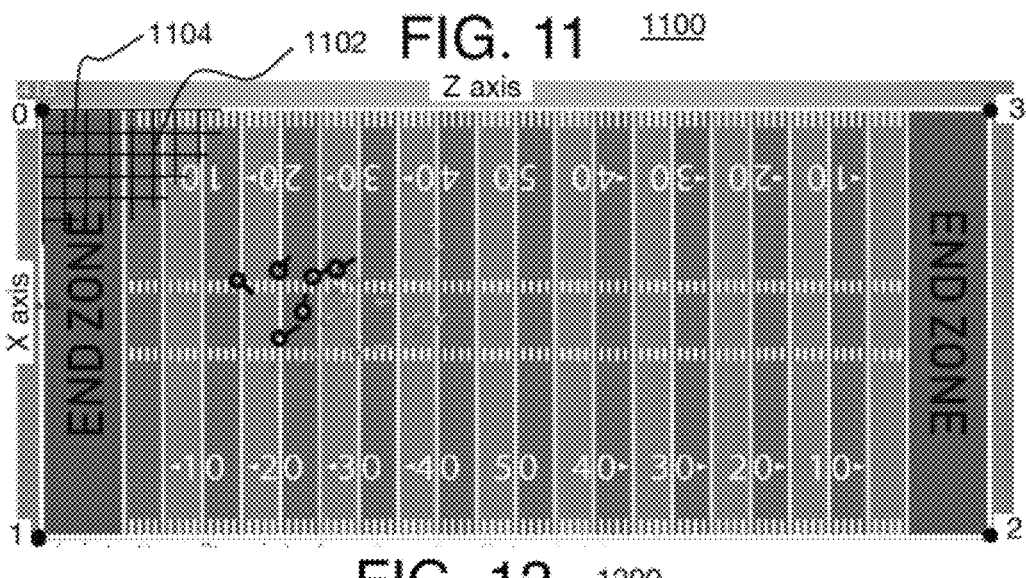
FIG. 11 1100
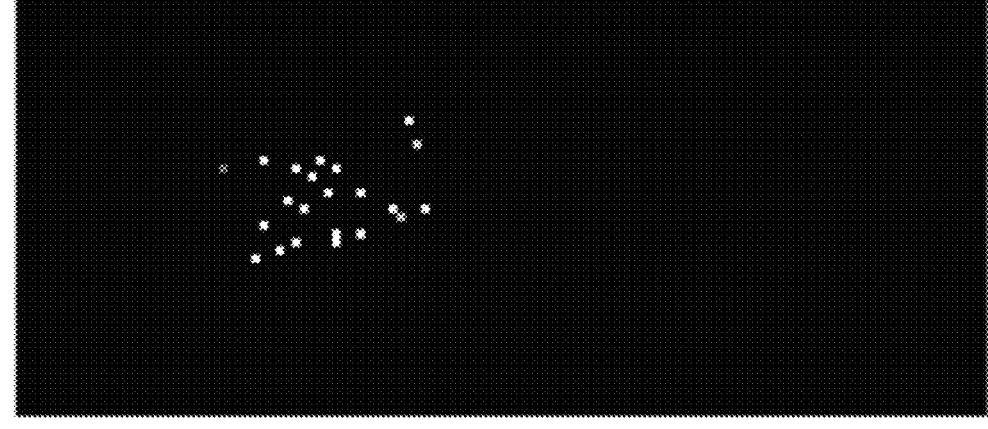
FIG. 12 1200
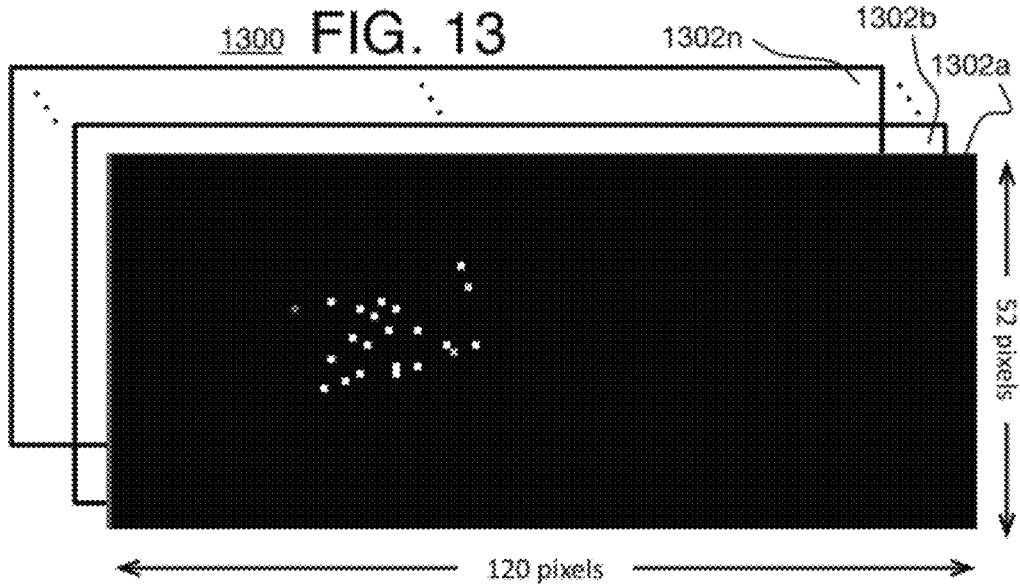
1300 FIG. 13

1400

1424

1426

1410 1412

1414 1416

1406 1408

1402 1404

1418 1420 1422

1600

1602

1604

1606

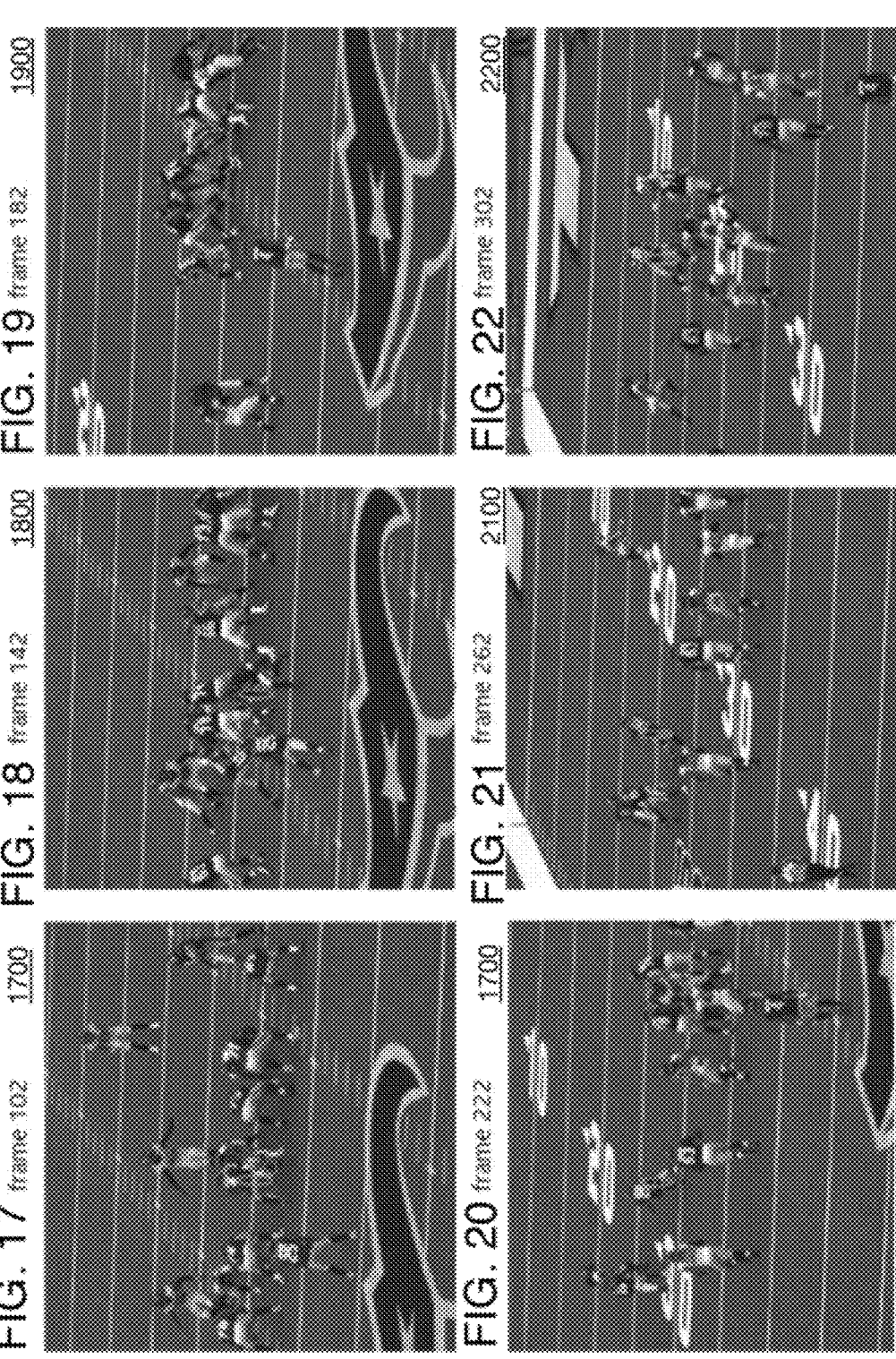

METHOD AND SYSTEM OF AUTOMATICALLY ESTIMATING A BALL CARRIER IN TEAM SPORTS

CLAIM OF PRIORITY

This Application is a National Stage Entry of, and claims priority to, PCT Application No. PCT/CN2021/100295, filed on Jun. 16, 2021 and titled "METHOD AND SYSTEM OF AUTOMATICALLY ESTIMATING A BALL CARRIER IN TEAM SPORTS", which is incorporated by reference in its entirety for all purposes.

BACKGROUND

High-resolution camera arrays can be used at sporting events such as stadiums or arenas to capture images of the sporting event on a field, such as with American football, rugby, or soccer, for example. The captured image data can be used to create volumetric video via object segmentation and 3D reconstruction to provide immersive media experiences where viewers can watch action in the sporting event from any angle and even enjoy the scene from a player's perspective and especially the player that is carrying the ball, often referred to as be-the-player (BTP) mode. However, automatic image processing applications with object recognition and object tracking usually cannot adequately track a ball during action on a field of play of a team sport since the ball is often too difficult to see. Thus, conventional tracking applications often do not adequately determine which player is carrying the ball.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 5 is a flow chart of a method of automatically estimating a ball carrier in team sports according to at least one of the implementations herein;

FIG. 8 is a table of player tracking results according to at least one of the implementations herein;

FIG. 10 is a detailed flow chart showing a method of ball carrier estimation according to at least one of the implementations herein;

FIG. 11 is a top view image showing a sports field with players on the field;

FIG. 12 is an image showing player positions on a field view image according to at least one of the implementations herein;

FIG. 13 is an image showing a field view images with multiple neural network channels according to at least one of the implementations herein;

FIG. 17 is an image showing ball carrier tracking results according to at least one of the implementations herein;

FIG. 18 is another image showing ball carrier tracking results according to at least one of the implementations herein;

FIG. 19 is another image showing ball carrier tracking results according to at least one of the implementations herein;

FIG. 20 is another image showing ball carrier tracking results according to at least one of the implementations herein;

FIG. 21 is another image showing ball carrier tracking results according to at least one of the implementations herein;

FIG. 22 is another image showing ball carrier tracking results according to at least one of the implementations herein;

DETAILED DESCRIPTION

Figure 1:
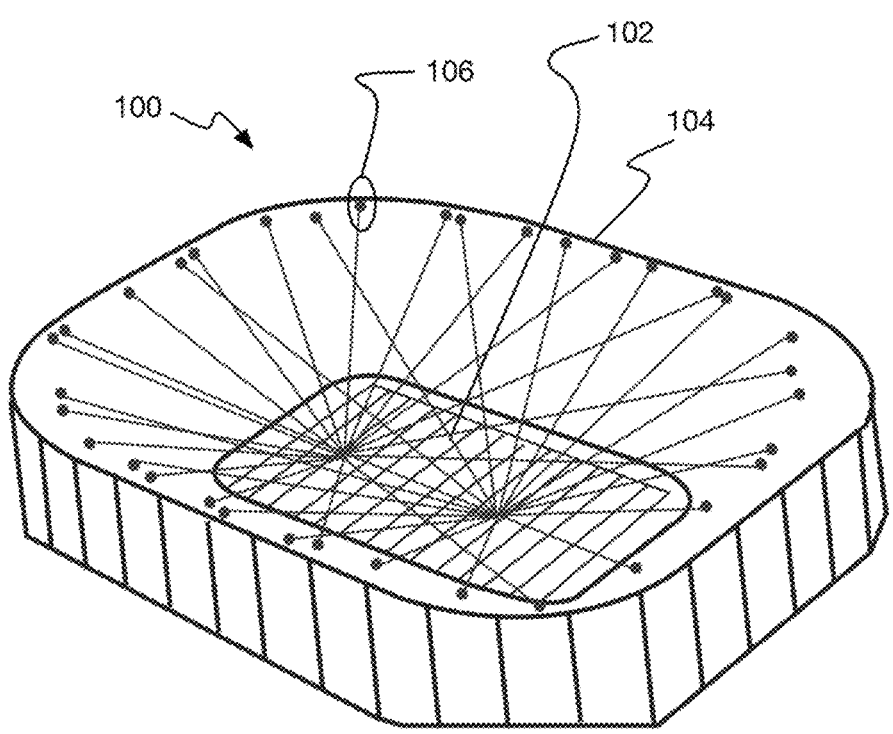
FIG. 1 is a 3D view of a stadium with a camera-array placed around an athletic field and to be used according to at least one of the implementations provided herein.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices, professional or commercial electronic devices such as one or more television cameras, video cameras, or camera arrays that surround an event to be recorded by the cameras, and/or consumer electronic (CE)

devices such as imaging devices, digital cameras, smart phones, webcams, video cameras, video game panels or consoles, televisions, set top boxes, and so forth, may implement the techniques and/or arrangements described herein, and whether a single camera or multi-camera system. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein may also be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods of automatically estimating a ball carrier in team sports is described below.

As mentioned, a number of 3D imaging processes generate 3D representations of athletes by using camera arrays placed around an athletic field in order to perform a be-the-player (BTP) mode where a display is shown that provides the perspective of a player on the athletic field, which is often the ball carrier. However, conventional athlete and ball tracking applications cannot recognize and track a ball carrier with sufficient accuracy because it is very difficult to see a small ball on the images of a sport being played on an athletic field. Thus, tracking the ball carrier is either performed manually or by using sensors placed in the ball.

As to the manual operations, a person views images of the athletic event and annotates the images to indicate which player is carrying the ball. This is very time consuming because the ball is usually relatively small compared to an athlete's body, and the multiple players on the field result in heavy occlusion where their bodies can block a camera's view of the ball. Also, a player often intentionally blocks a view of the ball by holding the ball close to their body and covers the ball with their arms to attempt to disguise which player has the ball. Otherwise, player uniforms, player skin color, or background of the images can have texture that can be similar to the ball's texture thereby blending the ball in with those areas, resulting in hiding the ball, or resulting in a mistaken positive identification of the ball at a location where the ball is not present, all of which can occur during the manual process, and explains why there are no successful object recognition and tracking applications that can perform this task with sports that hide the ball as mentioned, such as American football, rugby, and so forth. Such manual ball carrier tracking also has the disadvantage of being non-scalable since it is limited to a person watching videos so that when multiple athletic events occur at the same time, and BTP mode must be provided during those games, then additional people are needed to perform the annotating with one person per game for example.

Other attempts at ball carrier tracking use a sensor approach where a radio frequency identifier (RFID) is inserted into the ball. In this conventional case, the RFID coordinates of the ball are only in 2D, and still need further alignment and calibration with video footage to place the ball in a 3D model of the event, which can be significantly inaccurate. Specifically, sensor based solutions have a strong dependency on third parties and need additional effort to coordinate the sensor position with the camera systems so that timing on both of the coordinate systems of the two different positions are consistent, which can have a lot of errors. Also, current sensor solutions usually only output a 2D ball position in a field plane without height information which can be important to determining whether the 2D location of the ball is accurate.

To resolve the issues mentioned above, the disclosed method and system automate the ball carrier detection and tracking by using a convolutional neural network (CNN) based algorithm to detect and track a ball carrier. The CNN treats each player on the field as one pixel (or in other words, a grid space), and encodes players' characteristics such as player position, velocity and body orientation, and so forth as detailed below. This forms the features at each pixel (or grid space), and infers the ball carrier's location. The disclosed method can automatically localize the ball carrier with high accuracy because the grid or field view image (or bird's eye view) often is a very good way to see player formations and patterns of player and ball movement on an athletic field in a team sport. Thus, providing the features, which in turn are input to the neural network, with team context information, enables the neural network to learn player formations, and multiple player (or neighborhood) and ball movement patterns, that increase the likelihood of tracking a ball carrier.

By identifying the ball carrier automatically, the disclosed method can automate the ball carrier identification in a number of sports such as American football, enable BTP content creation, and simplify operator effort. Meanwhile, by estimating which player is the ball carrier during a game, ball possessing statistics can be collected for further sports analysis, and so forth. While the disclosed method discussed herein is applied to the example of American football, it will be appreciated that the disclosed method can be used with any sport or team based event with a ball, and may be applied successfully to rugby, soccer, hockey, basketball, baseball, cricket, water polo, and so forth. Thus, the term field is meant in a general sense to refer to any athletic or other area that has players or people on a team and with a ball being moved around, and whether in a sport or other event. Thus, a field can refer to a court (such as a basketball court or volley ball court), rink, arena, pit, cage, and so forth.

Referring to FIG. 1 for more detail, multiple camera video data may be used to capture images of an athletic event and generate neural network (NN) input. The camera system may be pre-installed in a stadium or arena, which is used generically herein to refer to any venue with an event with teams. Specifically, a multi-camera system 100 used to record events, such as athletic events, may capture athletes in images from a number of different perspectives. The images then can be used to create images from virtual camera viewpoints permitting the athletes or events on the field to be viewed from just about any desired angle, including for the BTP perspective. System 100 may have cameras 106, such as 30 or 36 cameras by one example, mounted around a field 102 at a stadium, arena, or other venue 104 that holds an event that is, or can be, viewed on still photo or video displays, such as live television or later on recorded videos. Such a camera system 100 may be mounted near the top of the stadium 104 above stands or other positions so that the cameras 106 are out of the line of sight of spectators at the stadium. The cameras 106 may be fixed so that registration between camera images is predetermined, and by one form, the cameras may provide 5K resolution images. In the conventional system, the system often may collect images from the array of cameras 106, segment the content of the images into objects, and apply 3D reconstruction of the objects to create a point cloud per multiple fixed camera inputs. Images from virtual camera positions can then be formed by projecting data from the point cloud to an image plane. Separately, whether or not a 3D model was generated, 3D position data of the players and ball as well as other data of a player mentioned below may be computed and the estimated ball position then can be retrieved for ball carrier tracking so that image processing applications such as BTP can be performed.

Figure 2:
FIG. 2 is an image of an athlete on an athletic field to show the be-the-player perspective of the athlete.
Figure 3:
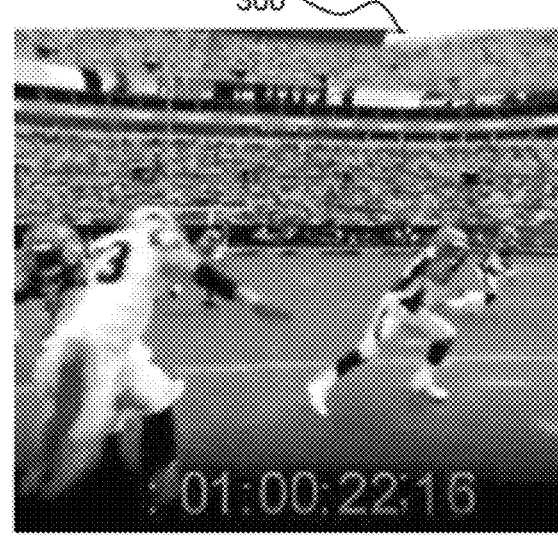
FIG. 3 is an image showing the be-the-player perspective of the athlete of FIG. 2.
Figure 4:
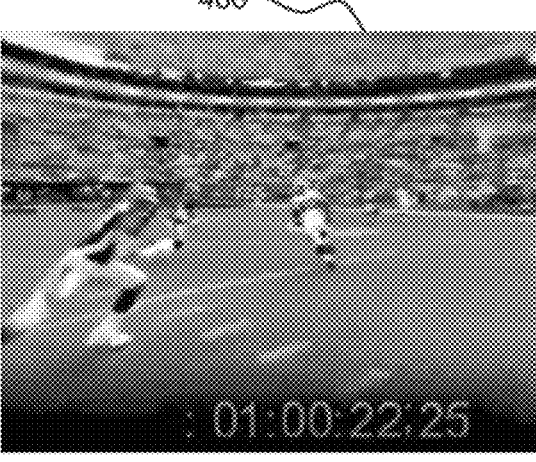
FIG. 4 is another image showing the be-the-player perspective of the athlete of FIG. 2.

Referring to FIGS. 2-4, an example of BTP is provided and so that audiences can view the BTP images and enjoy an "in the game" experience. Particularly, an image 200 shows the ball carrier that is circled and is a quarterback in a game of American football. The BTP mode will show the perspective of this player. An image 300 shows a first snapshot of the video forming the BTP perspective, while image 400 shows a slightly subsequent snapshot of the BTP perspective. Such a view can give the observer an understanding of why the ball carrier makes a decision to throw the ball to a teammate or hold on the ball to run, by one example.

Referring to FIG. 5, an example process 500 is a computer-implemented method of automatically estimating a ball carrier in team sports. In the illustrated implementation, process 500 may include one or more operations, functions or actions as illustrated by one or more of operations 502 to 506 numbered evenly. By way of non-limiting example, process 500 may be described herein with reference to example image processing systems 600 and 2300 of FIGS. 6 and 23 respectively, and where relevant.

Process 500 may include "obtain 3D location data of athletes and a ball based on images of an athletic event on a field" 502. Here, 3D data of players and a ball, such as 3D coordinates, may be obtained from a memory or remote computing device. By one example, the 3D data of the players and the ball may be generated by object detection and object tracking operations performed on image data of images captured on an array of cameras around an athletic field.

Process 500 may include "generate feature vectors of individual players on the field" 504. This operation refers to generating characteristics of the players and ball on the field. By one approach, the field is divided into grid spaces of a bird's eye view or field view image, where the grid spaces are referred to herein as pixels for NN processing purposes. The field view image very conveniently and naturally provides excellent views of player formations and player position patterns that assist with determining a position of a ball carrier as explained below. Each or individual grid space or pixel with a player located at that pixel may have a feature vector. The feature vector values at all other non-player pixels will be zero to maintain a channel size that is the size of the grid for a neural network. The feature vectors may include data related to player attributes such as the player jersey number; player motion such as the player position, velocity, and orientation, as well as a count of the number of neighbor team mates and neighbor opponents within a certain neighborhood block with a current player. By one form, neighbors are within a 5×5 pixel block of the current player as one possible example. By avoiding strict distance thresholds between neighbor players and used alone without other neighborhood shape restrictions, the method and system herein are provided with much more flexibility to learn many more observable player patterns, and in turn, more accurate training of the neural network. This is explained in greater detail below.

The feature vectors also may include ball attributes such as the ball position on the field grid which is measured as a distance from the ball to the current player with the feature vector. A multi-frame data factor also is considered and includes differences in features, including differences in ball and player positions as well as other features, and from interval to interval of frames being analyzed together. So for example, the differences may be the difference of feature values every 30 frames when multiple frame computations are being performed for groups of 30 frames for example as mentioned below for smoothing of ball carrier probabilities. By other forms, the intervals for smoothing and for the multi-frame feature here can be different. It should be noted that the field grid may be referred to herein just as the grid, pixel space, or generally as the bird's eye view or field view image depending on the context.

Process 500 may include "automatically estimate a ball carrier position on the field comprising inputting the feature vectors arranged into multiple channels and input into a convolutional neural network that outputs a ball carrier probability map indicating a likely location of the ball carrier on the field" 506. By one example approach, the feature vectors are divided into the channels, and by one form, with data of one different type of feature collected for each individual channel. For example, one channel may be for a player position, while another channel may be for ball position, and so forth. The channels are then concatenated and input together to a convolutional neural network. The network is trained to generate a ball carrier probability map that provides at least the probability of a ball carrier at each player position on the field, although it could be for every position on the field. It will be appreciated that any discussion herein of the ball carrier, the ball, the players, or any other object being or performing some action "on the field" also refers to that location or action being indicated on an image of the field as discussed herein.

Thereafter, the player with the highest confidence value on the field as well as other players within a certain neighborhood of the player with the highest confidence are all considered candidates to be the ball carrier. The candidate with the highest multi-frame confidence score, such as an average over a number of frames, is determined to be the ball carrier.

Figure 6:
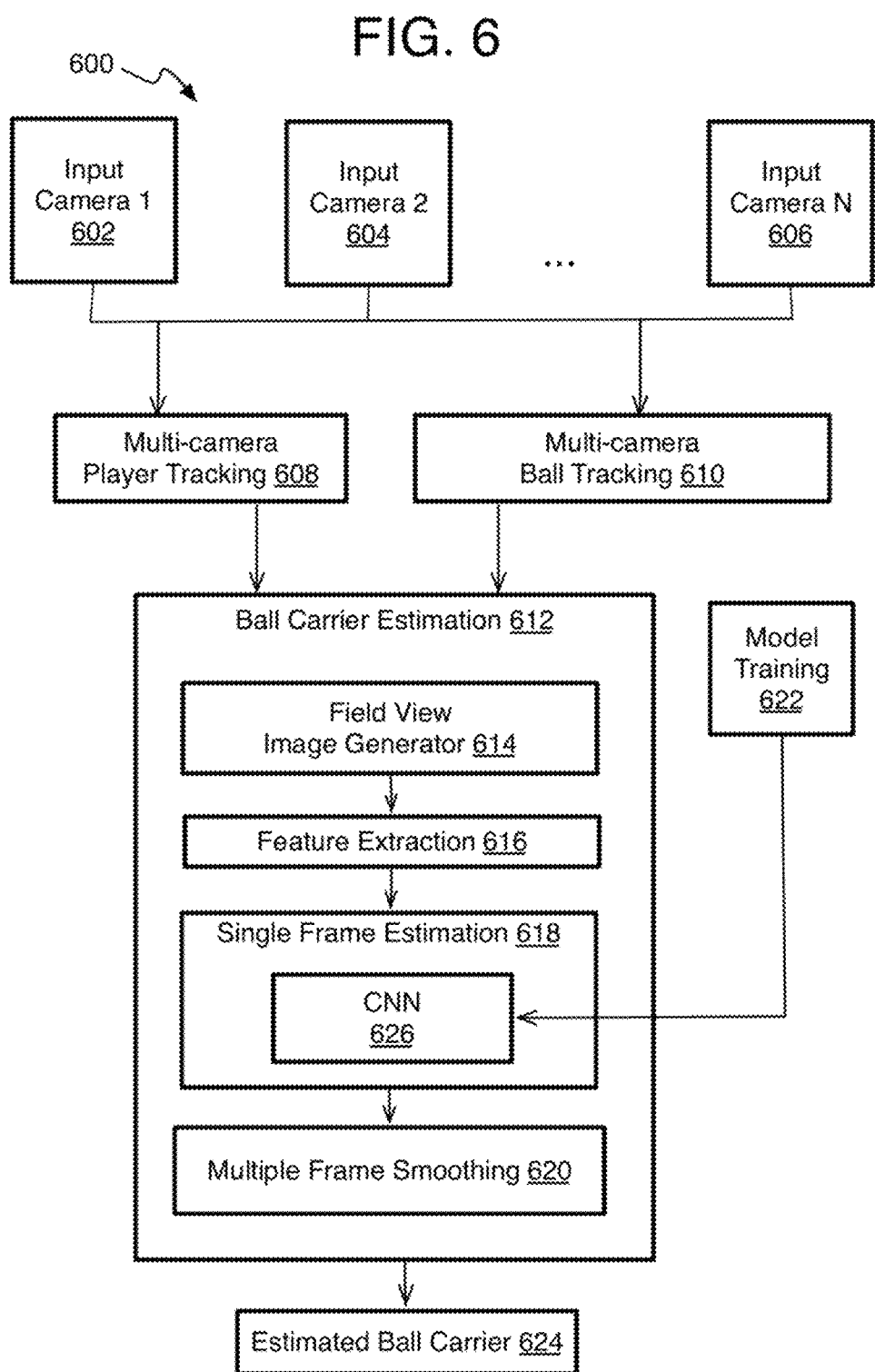
FIG. 6 is a detailed flow chart of a method of automatically estimating a ball carrier in team sports according to at least one of the implementations herein.
Figure 7:
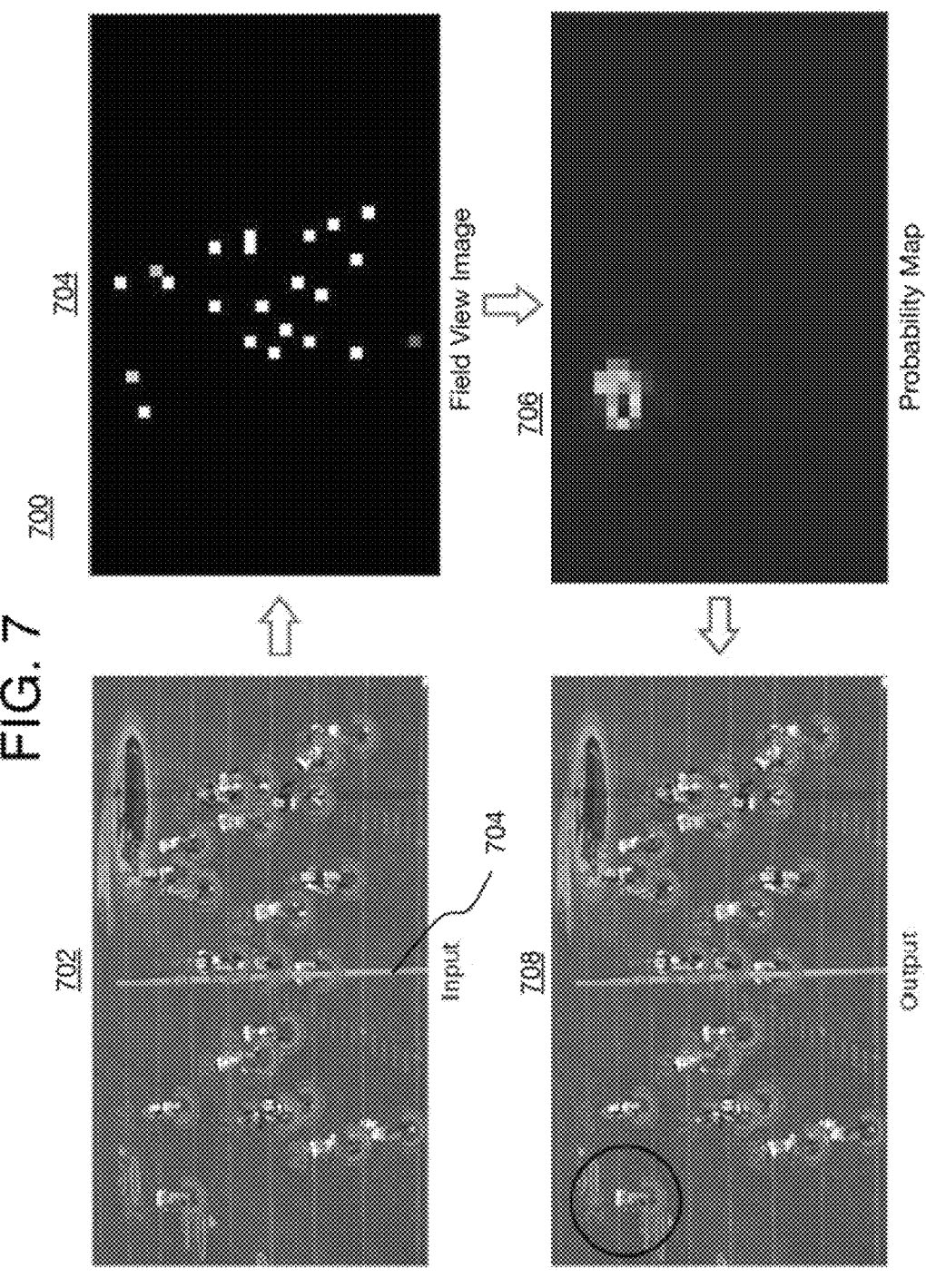
FIG. 7 is an image flow diagram of a method of automatically estimating a ball carrier in team sports according to at least one of the implementations herein.

Referring to FIGS. 6-7, an image processing system or device (or circuit) is arranged to perform automatically estimating a ball carrier on an athletic field, and may operate the process 700 shown by images 702, 704, 706, and 708, as well as process 1000 described below. The system 600 has a camera array with input cameras 602 to 606, a multi camera player tracking unit 608, a multi-camera ball tracking unit 610, a ball carrier estimation unit 612, and a model training unit 622. The ball carrier estimation unit 612 has a field view image generator 614, a feature extraction unit 616, a single frame estimation unit 618 with a CNN 626 trained by a model training unit 622, and a multiple frame smoothing unit 620. So arranged, the ball carrier estimation unit 612 outputs an estimated ball carrier 624.

The cameras 602-606 of the camera array are typically commercial digital cameras and is not particularly limited. The processing herein may be on one of the cameras or on a remote computing device whether a server, computer, or mobile device.

The multi-camera player tracking unit 608 receives image data of the multiple video sequences from the camera array and process the data to generate 3D player and ball positions, team ID, jersey number, moving velocity, body orientation of each player on the field and so forth. A number of known techniques are used to perform such object detection (or recognition) and tracking such as stereo feature matching and triangulation methods that may or may not construct a 3D model, deep neural network (DNN) techniques that match object shapes, principal line fusing-based multi-camera object detection techniques, as well as many other different types of object segmentation, detection, recognition, and tracking algorithms.

Referring to FIG. 8, a sample table 800 of results of player tracking for American football in this example, shows 22 players being tracked. Each player has, from left to right, one unique global ID (id) or index number, a 3D position in a 3D model or reconstruction that corresponds to coordinates of the field of play, a jersey number, a team ID, a velocity, and a body orientation where the coordinates are in 2D in (x, z) coordinates where y is the vertical axis, and in the same coordinate system as the 3D position data.

Also, the multi-camera ball tracking unit 610 may perform multi-camera ball tracking which may include single camera ball detection, tracking, and 3D-reconstruction to output a unique 3D ball location in every frame. By one form, ball tracking is performed by using ball detection algorithms such as SSD, Fast R-CNN, Faster R-CNN, YOLO, etc. Any other appropriate methods may be used for the detecting, such as mask R-CNN, and so forth. Such ball detection is disclosed by Chinese Patent Application No.: 202010928174.X, filed Sep. 7, 2020, which is incorporated herein for all purposes.

The ball detection may be performed in each or individual frames with a high resolution input (e.g., 5120×3072). Then, the detection results are used by ball tracking algorithms to crop a smaller area (e.g., 288×288) and start tracking the ball 2D position in multiple individual cameras (or each camera). This enables obtaining multiple ball positions each from a different camera. Finally, a multi-cam 3D build module can be used to aggregate the tracking results from multiple cameras and compute a 3D ball position for each frame using projective matrices.

Figure 9:
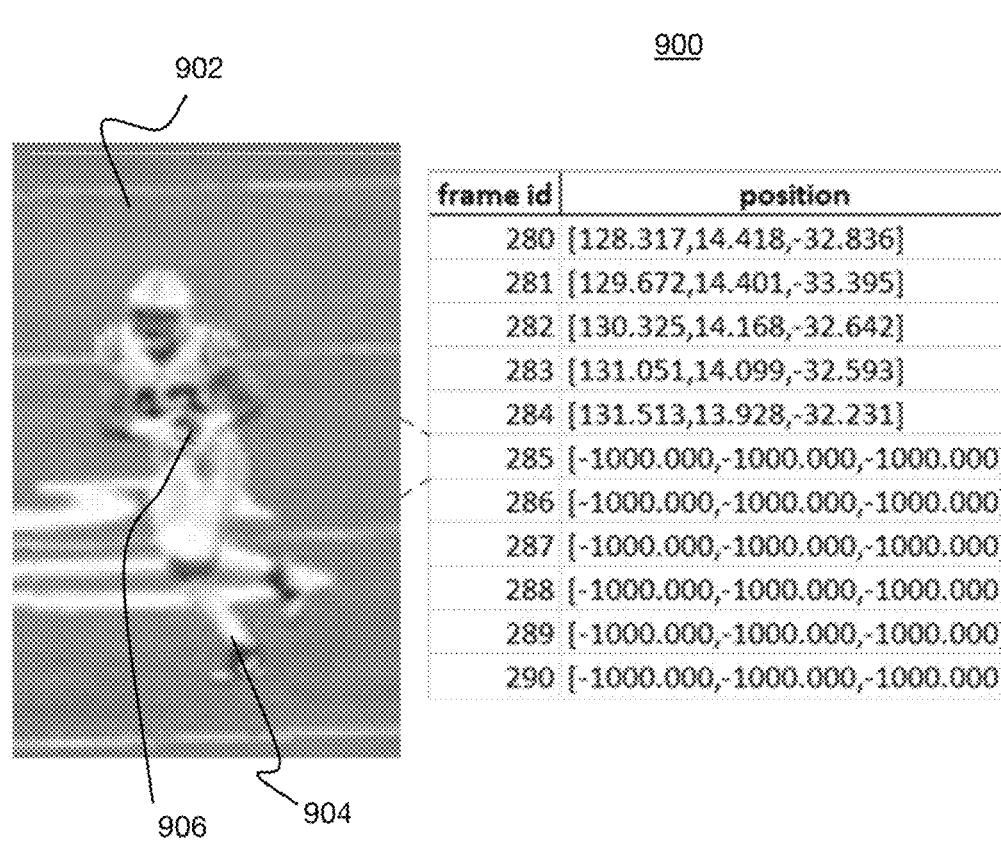
FIG. 9 is a table of ball tracking results according to at least one of the implementations herein.
Figure 14:
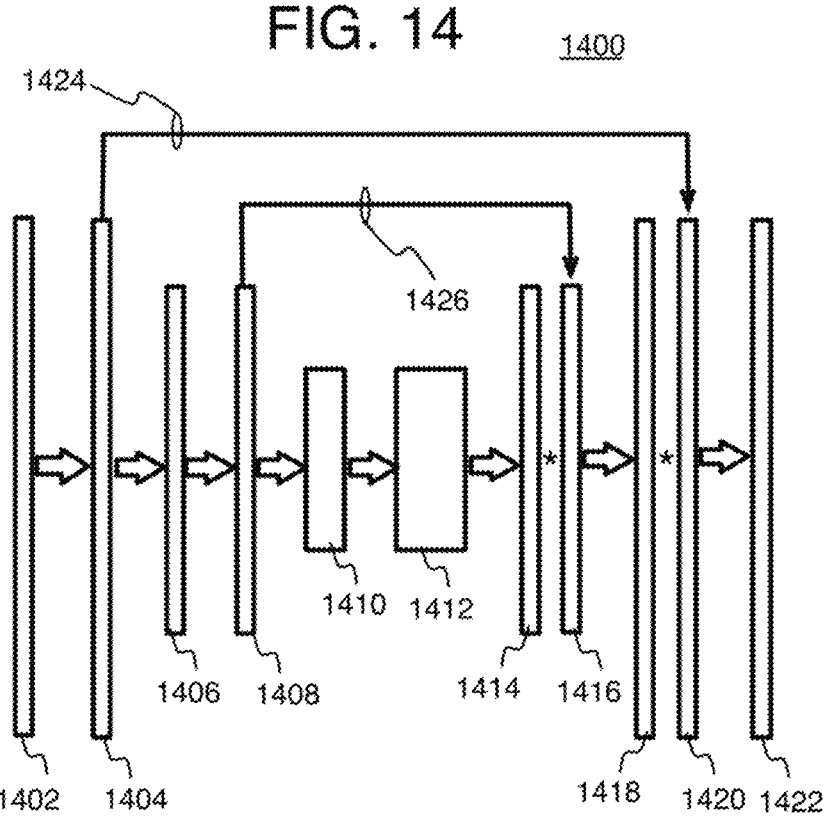
FIG. 14 is a schematic diagram of an example neural network architecture according to at least one of the implementations herein.

Referring to FIG. 9, however, the correct ball 3D position cannot always be obtained, especially when the ball is held and hidden by a player. Therefore, the ball tracking results contain both valid and invalid ball 3D position. For example, a table 900 shows ball position results with 3D coordinates. A corresponding image or frame 285 to 290 shows a player 904 covering (or occluding) a ball 906 such that it cannot be detected. In this case, invalidity coordinates are used, such as [−1000.0, −1000.0, −1000.0] to represent a 3D ball position when the ball cannot be tracked.

Referring to FIG. 7, once the player positions and ball position are determined as shown on input image 702, then the ball carrier estimation unit (or circuit) 612 may perform a ball carrier estimation processes 700 and 1000 (FIG. 10). The input image 702 shows the players identified by jersey number, and a color of the ring around a player indicates the team of the player, such as blue or red. The straight line 704 indicates a direction of the play to provide general context to the likely motion of the ball according to typical player formation in a certain game, here being American football.

Then, the ball carrier estimation unit (or circuit) 612 generates a field view image which is a top or bird's eye view of the field where only player positions are shown by bright pixels. Feature vectors of player and ball characteristics are generated for each or individual player, where the features may include the player jersey, position, velocity, orientation, as well as the number of other players within a neighborhood of the current player, closeness to the ball position, and a multi-frame factor. A field view image channel may be formed for each different type of feature. The channels are input to a convolutional neural network to output a ball carrier probability map 704. The map 704 can be represented as a heatmap for explanatory purposes where different colors indicate different players. The probability map 704 is used to determine which player has the highest confidence values over multiple frames, and is declared the ball carrier on the output 708 image and for a specific time frame (specific interval of frames). The ball carrier is circled on the output image 708.

Referring now to FIG. 10, the ball carrier estimation unit 612 also operates a detailed process 1000 of automatically estimating a ball carrier in team sports. In the illustrated implementation, process 1000 may include one or more operations, functions or actions as illustrated by one or more of operations 1002 to 1030 generally numbered evenly. By way of non-limiting example, process 1000 may be described herein with reference to example image processing systems 600 and 2300 of FIGS. 6 and 23 respectively, and where relevant.

Referring to FIG. 11, process 1000 may include "form field view image" 1002. Here, the ball carrier estimation problem may be considered a human keypoint detection problem where each player in the given frame is treated as one pixel (or grid space) 1104 of a grid 1102 created on the bird's eye field view image 1100, and in this example, an American football field, (only part of the grid is shown, and it is not shown to scale). The size of the football field 1100 is used to determine the grid (or pixel) spacing. Thus, forming the field view image 1002 may include "create field grid" 1004. The grid 1102 is created by setting corner points 0 to 3. Then the rectangle area of the field (or field view image) 1100 is divided equally into 120×52 pixels (or grid squares or grid spaces) 1104 given that the standard American football field is 120 yards (109.7 m) long and 53⅓ yards (48.8 m) wide, so that each pixel 1104 is approximately 0.9 m² (35.43 in² or very close to 1 sq. yd) in real world dimensions.

Referring to FIG. 12, forming 1002 the field view image may include "map players" 1006. So now, the corresponding field view image 1100 with grid 1102 is converted into a player map 1200. Here, the method obtains the 3D player tracking positions of a single frame, and maps the player onto the map 1200 thereby positioning the payer in the closest pixel (or grid space) 1104. The map 1200 shown here itself is mainly just for visualization purposes and the visual map itself is not needed for processing as long as a map of a list of athlete-pixel location correspondence is provided. By one example, the coordinates of the player are (x, z) where the Y-axis is vertical or height, and are corresponded to the coordinates of the 120×52 pixels for example. The 3D position of the athletes will already have its own correspondence to the dimensions of the football field such that the conversion is simple. As to the map 1200, the pixels are black where no player exists and is bright white to grey where one player is in a pixel based on the player's (x, z) position. If one player is in a pixel, the pixel value is set at the player jersey number. Otherwise, the pixel value is zero. The darker or grey pixel simply indicates a lower player jersey number since the jersey numbers are set to the typical pixel value range of 0 to 255 that still correspond to a grey-scale or color value for the player map 1200.

Next, process 1000 may include "perform feature extraction" 1008, and this involves "form feature vectors" 1010. In this operation, the method extracts features for each or individual player based on the multiple frame input of the player tracking and ball tracking results. This provides the individual player with a fixed length feature vector with a pre-set number of features each with a certain format for the vector as explained below. When no player exists in a pixel location, all of the features in the vector are all set to zero.

The features may be categorized into at least four classes where each class may have multiple different features. Each player or ball characterization is considered a different feature, and as explained below, each different feature may be placed into a different channel for inputting into a neural network. The four feature classes include player attribute related features, player movement related features, ball position related features, and multi-frame related features. The attribute related features may be players' jersey numbers. Besides identifying the player specifically, the Jersey number range in which a jersey number is from can indicate a player role, and in turn a likelihood of possessing the ball, at least in American football. The neural network used herein is able to learn these role number trends in the jersey number for holding the ball or not.

The player movement related features may include 3D position, velocity, and body orientation of a current player as provided by the 3D multiplayer tracking mentioned above. This actually can involve using six different feature channels where a single channel can handle both positive and negative values, with the three 3D position coordinates, the velocity, and two orientation coordinates, each having a different channel Different configurations could be used as well.

Figure 16:
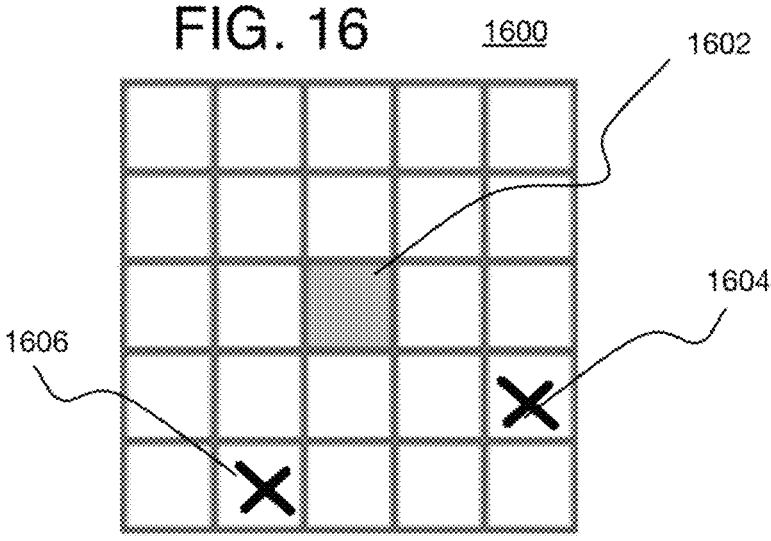
FIG. 16 is a schematic diagram of a part of a field grid used to show neighbor player positions according to at least one of the implementations herein.

This class also may include movement related features of other players within a certain neighborhood of a current player. This may include those players, placed by using their 3D position, onto the grid 1102, within a certain grid or pixel area of the current player. Thus, as shown on FIG. 16, a part of the grid 1600 is shown, and by this example a 5×5 pixel neighborhood or block with the current player at the center pixel 1602. The method will include the number of players 1604 and 1606 that are within the neighborhood 1600 and a count of which team the players are on. So this is actually two features of a single pixel location: the number of same team players within the neighborhood and the number of opponents within the neighborhood. It will be appreciated that the size of the neighborhood can be determined by experimentation to balance performance and accuracy.

The ball position related feature is extracted by calculating the Euclidean 3D distance between the 3D player position and ball position as determined for the frame as mentioned above, and if the ball position is valid. If no ball position is valid for a certain frame, this feature is just set to be a predefined value such as 0.

Regarding the multi-frame related features, multiple-frame features are considered to factor the feature characteristics over time in order to reduce the effect of any outliers. The multiple frame considerations will be set to consider changes from one interval of frames to a next, which can be determined by experimentation as well. By one form, this may be 30 frames for 30 fps video speed so that it covers 1 second. The multi-frame related features may be differences in feature values from one time interval to the next. So for this example, the multi-frame related feature may be the difference in player and ball position at frame 1 and at frame 30 in a video sequence when 30 frame intervals are being used. Likewise the difference in other player features in the neighborhood of the current player can be a multi-frame feature. Each feature that can be differenced from one time point (starting at an early frame interval for example) and another time point (at the start of a next frame interval) can be a separate multi-frame feature, each having its own channel.

Referring to FIG. 13, the feature extraction 1008 operation then may include "generate multiple feature channels from player feature vectors" 1012, and as shown by images 1300 of the field view image, the feature vectors of each player (and pixel location on grid 1102 which will be zero with no player data) will be arranged into channels, each having the same size, here 120×52, as the field view grid 1102. Each channel 1302a to 1302n holds values for a different feature or different coordinate value or coordinate sign of a feature when a single feature has multiple coordinates (such as x, y, z). No limit exists to the number of channels as long as the method is still efficient, and by one form, more than 50 channels may be generated.

Turning now to the CNN used to generate the ball carrier probability map that indicates or estimates which player most likely is the ball carrier, the neural network 626 is trained in preliminary operations before run-time by end-users, and then is uploaded or updated on a user's computer. Thus, as a preliminary matter, process 1000 may include "train CNN model" 1022. Here, the multiple channels in field view image are generated to be the input to the CNN in the same way as would occur during run-time as described above so that the input is 120×52×(number of channels). The channels of a same single frame are concatenated together to be used together as the input to the neural network 626, and this is repeated for each or individual frames. The architecture for the neural network is explained below with the single frame estimation operation.

The output provides a single channel ball carrier probability map. One example map 706 was explained above and provided as a heatmap for explanatory purposes (FIG. 7) to show the player grid or pixel location that has the highest probability to be the ball carrier. Supervised output training samples are used that are each a label mask where the pixel of a ball carrier is set at 1, while all other pixels are set to 0 on the grid size channel output and at 120×52 pixels in this example, which is the same size as the field view image and the input channels. The training 1022 may include "vary ball position on output mask" 1024. Thus, the training proceeds frame by frame, and where the different input samples may have different ball positions such that the ball carrier position '1' on the grid of the output mask may be at different locations depending on the sample, and then the neural network is re-run with the different input to change the ball position. By one form, this may be repeated for all pixel locations or just some portion of them, such as about 100 pixel locations. To accelerate the model convergence in the training procedure, the label mask further may be smoothed by 5×5 gaussian filter.

Now continuing with the run-time process, process 1000 may include "perform single frame estimation" 1014, where the trained neural network is now used to generate the ball carrier probability map during a run-time. Thus, the estimation operation 1014 may include "run CNN to get ball carrier probability map" 106, where the concatenated feature channels are input to the neural network 1400 and run. By one example network architecture, a relatively simple neural network may be used with some similar aspects to a GitHub keypoint detection network (See github.comipprpi-simplecvreproductionitree/masterisim-ple_keypoint) as a base model. By one form, the network here may include three convolutional layers, two max pooling layers, and two up sampling layers in order to maintain the output resolution of the output data from the neural network the same size as the input size.

In one specific example, a neural network 1400 receives 52×120×53 feature channel input, with 53 channels in this example. The first layer 1402 is a convolutional layer that performs a 3×3 convolution, batch normalization, and a rectified linear unit (ReLU) operation to form a next layer 1404. The next layer 1404 is a max pooling layer that generates a 26×60×64 layer 1406. The max pooled layer 1406 is then convolved with the operations mentioned before into a layer 1408, which is then max pooled to form a 13×30×128 layer 1410. This layer 1410 is then convolved as with the previous operations into a layer 1412 with a 13×30×246 layer.

Thereafter, the layers upscale the data back to the original channel sizes. Thus layer 1412 is convolved and upsampled by simple bicubic interpolation for example, to form a 26×60×64 layer 1414. The layer 1414 is then multiplied, by element-by-element multiplication by a 1×1 convolved (1424) second convolved layer 1408. The resulting multiplied layer 1416 is then convolved and upsampled to form a layer 1418. Layer 1418 is then multiplied (1424), element by element, by a 1×1 convolved (1426) first convolutional layer 1404 resulting in layer 1420. The layer 1420 is then convolved at 3×3 to form a single output layer 1422 of 52×100×1 as the ball carrier probability map where each outlet node of the network is a probability that the ball carrier is at a different pixel of the field view image. Many other architectures could be used.

Specifically, the increase in ball carrier identification accuracy by the present method is at least partly due to better factoring of team context rather than the neural network structure alone. The neural network can automatically and inherently learn and encode the team context by stacking multiple convolution and pooling layers as described above for example. In order to better capture the team context, the features described above and provided as input to the model (or neural network) should be both flexible to recognize many varying player position patterns on the field (which may be referred to as tracking players or local player patterns within a neighborhood) and should factor team patterns, such as down formations, typical of American football plays for example, and that may indicate likely ball positions. The following provides more detail.

First, the grid representation in the form of the bird's eye, top, or field image view described above, substantially increases the accuracy of the ball carrier estimation modeling because many field or court team sports have particular team player position patterns and formations, whether by game rules, intentional strategies, or typical resulting player positions simply due to the nature of the typical movement of players in a certain type of game. Thus, a ball carrier estimation model may easily recognize player formations and patterns in top view that may be repeated in a game, such as American football, even though such repetition may be very difficult to see to an average person viewing the game, and is much more complex for automatic tracking systems when other perspectives are used. A CNN-based model can use stacks of convolutional and pooling layers to analyze team context information, such as a team formations and teammates' or opponents' position and/or moves, to more accurately determine the most likely location of the ball carrier. Thus, the ball carrier estimation problem is basically a classification problem because the ball needs to be localized to the ball carrier among all tracked players. If each player is treated individually on a given frame, however, the team context information is missed resulting in less accurate ball carrier estimations. It should also be noted that the use of field view images is very scalable both in grid size and features, which can be performed simply by adding more channels for more features.

Figure 15:
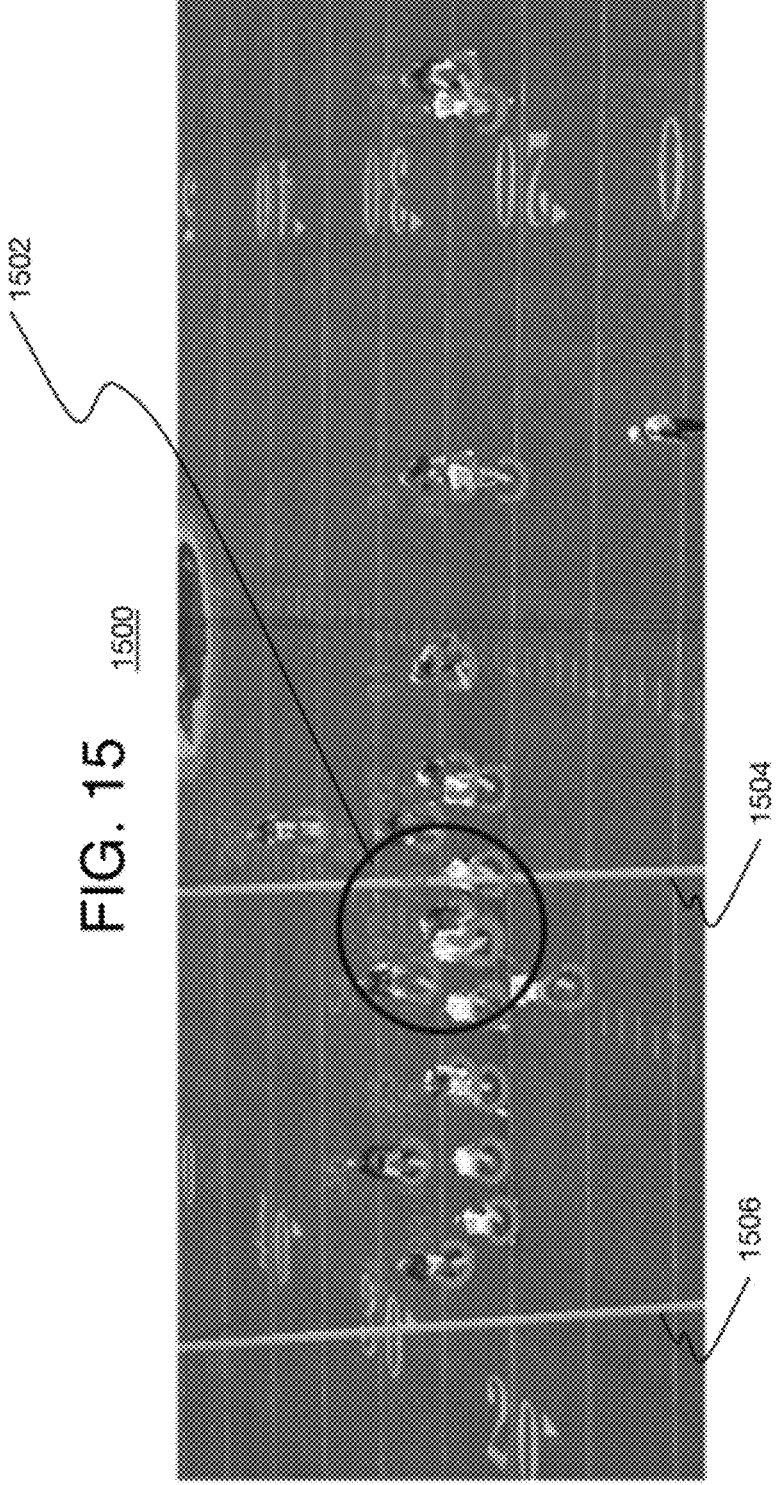
FIG. 15 is a marked-up image of an athletic field and identified players to demonstrate team context.

Referring to FIG. 15, and with regard to a specific example, a screenshot 1500 shows formation lines 1502 and 1504 that show a football formation, and in turn, the general direction of play, which can be recognized by the neural network model. The typical formation of such a scenario can assist with easily localizing the ball carrier which indicates the context information is factored in a better way. Usually in this case, the ball carrier should usually be the player towards the middle of the two lines 1502 and 1504. Thus, a field view image of this play, while treating each player as a pixel, can be a very effective way for modelling such context information.

Third, the present method and system uses neighbor feature input for the neural network, as described above, that promotes better player pattern matching by being very flexible. Specifically, other ball carrier and object tracking methods use node classification models where each player on an athletic field is treated as one separate node. This requires maximum distance thresholds in order to determine if two nodes of two players are neighbors and should have a bidirectional edge connecting the two nodes for message propagation between the two nodes. Thus, this message propagation can only occur when two nodes are close enough to share an edge, resulting in a relatively rigid system, and does not provide information on player position patterns as to when groups of players are all near each other, rather than near each other as a long chain of player positions for example. Stacking of neural network layers may improve the node interaction, but can cause oversmoothing errors where nodes are rendered indistinguishable from each other.

In contrast, the ability of the present neural network to factor how many players are within a neighborhood of a current player, such as with example neighborhood 1600 (FIG. 16) described above, regardless of the exact distance or direction to those players, provides the present system and method with great flexibility to match player or team formation patterns that indicate a more likely ball carrier. Such patterns or formations are more easily and naturally recognized from a bird's eye view, or in other words, from the grid or field view images. Just counting the neighbor players within a certain pixel distance of a current player, and especially when repeating this for each player, is much more flexible and precise so that different player arrangements and patterns can be recognized easier than using a maximum distance threshold alone to set a bidirectional edge between players. This advantage occurs because the use of the maximum distance alone will treat a chain of players with one player located near to at least one other player as the same situation as a group of players all near each other in a recognizable player pattern and within the same pixel block for example, thereby resulting in recognition of fewer player patterns. Thus, for example, setting the count for neighbor players at a 4×4 pixel (or meter or yard) block to define a neighbor to be about 2 meters from a player at the center of the block will be more flexible than setting a 2 meter maximum distance to form bidirectional edges between players. When the neighborhood aspect is used in the method disclosed herein, and especially when repeated for each player position, this provides great detail to recognize player position patterns much better than simply finding a chain of players.

Returning to process 1000, once the neural network outputs a ball carrier probability map that effectively localizes a maximum response value as a most likely ball carrier position on the grid, this potential ball carrier position is recorded by row and column index of that pixel and for an individual frame. This is repeated for multiple frames.

The estimation 1014 then may include "normalize" 1018, where the most negative value on the ball carrier probability map is forced to zero, while the maximum value on the map is set to 1 to normalize the range of values on the map from 0 to 1. Now, the values of the ball carrier probability map are more like probability (or confidence) values, and of the pixel that has the ball carrier.

The estimation 1014 next may include "get neighbor results" 1020. For this operation, players within a neighborhood of a player with the highest probability from the map may be considered ball carrier candidates in addition to the player with the highest probability. The neighborhood may be a block of pixels or grid spaces as with neighborhood block 1600 (FIG. 16), and the same size, here 5×5 pixels, as the neighborhood block 1600 used to generate the neighbor count feature as described above. Otherwise, the neighborhood for the candidacy count may have a different size than that for the neighbor count feature, and can be determined by experimentation.

Process 1000 may include "perform multiple frame smoothing" 1026, and this operation may include "calculate multi-frame confidence" 1028. After obtaining the ball carrier candidates as explained for operation 1024, the frame results are smoothed over multiple frames in order to reduce uttering and remove outliers. Specifically, a player global ID and confidence of being the ball carrier candidate may be recorded in each single frame. Then, the confidence values over a predetermined set of frames, say 30 frames by one example, are combined to form a representative value for each candidate player. The representative value may be an average or other computed representative value.

The smoothing 1028 then may include "select player with maximum confidence" 1030. So finally, the candidate player with the maximum multi-frame confidence is selected as final ball carrier for that set of 30 frames, which when the video is provided at 30 fps, is for one second. The 3D player position of the ball carrier can then be output by the system to identify the ball carrier.

Experimental Result

Referring to FIGS. 17-22, a ball carrier estimation result was determined for one American football game. The square bounding box in images 1700, 1800, 1900, 2000, 2100, and 2200 is the ground truth for ball 2D location while the ellipse is the ball carrier estimation result for the given frame. The quarterback in dark jersey #4 executes a handoff to his teammate running back #25 in frame 142. Then, running back #25 starts to move forward to an endzone, and is knocked down by defensive opponents in frame 302. The disclosed method can identify the ball carrier even when the running back #25 is running with the ball blocked by his body in a way that causes heavy occlusion so that it is very difficult to see the ball.

Also, the experiment was run on a large data set (143 American football games) and shows the disclosed system and method can achieve 93.9% accuracy. The result by using the present method also is a 6+% accuracy improvement over systems that use node models as described above.

It will be appreciated that the processes 500, 700, and 1000 respectively explained with FIGS. 5, 7 and 10 as well as flow of system 600 (FIG. 6) do not necessarily have to be performed in the order shown, nor with all of the operations shown or described. It will be understood that some operations may be skipped or performed in different orders.

Also, any one or more of the operations of FIGS. 5, 6, 7, and 10 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

The terms "circuit" or "circuitry," as used in any implementation herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor ("processor circuitry") and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other implementations may be implemented as software executed by a programmable control device. In such cases, the terms "circuit" or "circuitry" are intended to include a combination of software and hardware such as a programmable control device or a processor capable of executing the software. As described herein, various implementations may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Figure 23:
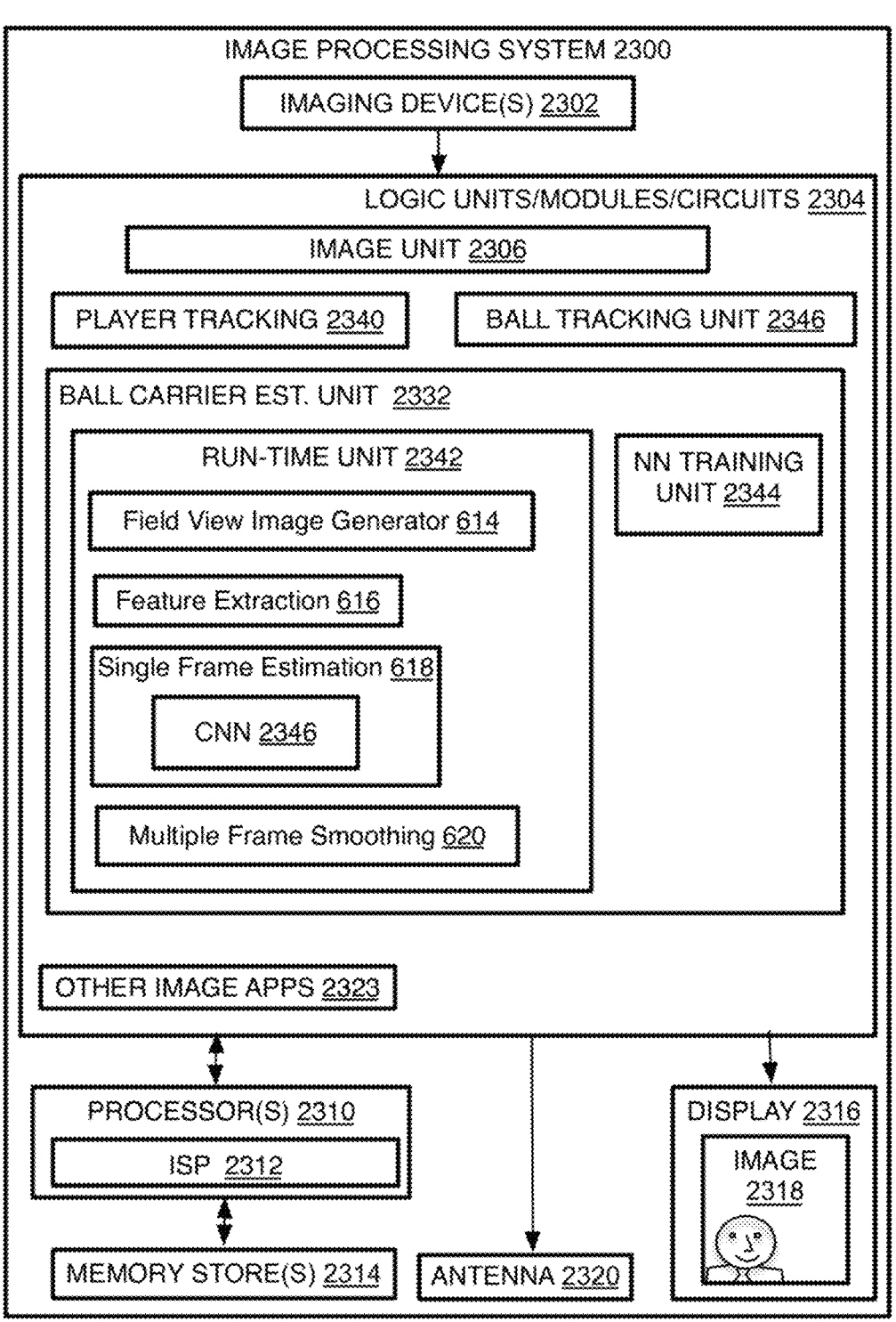
FIG. 23 is an illustrative diagram of an example system.

Referring to FIG. 23, an example image processing system 2300 is arranged in accordance with at least some implementations of the present disclosure. In various implementations, the example image processing system 2300 may have one or more imaging devices 2302 to form or receive captured image data, and this may include either one or more cameras such as an array of cameras around an athletic field, arena, rink, stage or other such event location. Thus, in one form, the image processing system 2300 may be a digital camera or other image capture device that is one of the cameras in an array of the cameras. In this case, the imaging device(s) 2302 may be the camera hardware and camera sensor software, module, or component. In other examples, imaging processing system 2300 may have an imaging device 2302 that includes, or may be, one camera or some or all of the cameras in the array, and logic units (or modules or circuits) 2304 may communicate remotely with, or otherwise may be communicatively coupled to, the imaging device 2302 for further processing of the image data.

Accordingly, the part of the image processing system 2300 that holds the logic units or circuits 2304 and that processes the images may be on one of the cameras or may be on a separate device included in, or entirely forming, the image processing system 2300. Thus, the image processing system 2300 may be a desktop or laptop computer, remote server, or mobile computing device such as a smartphone, tablet, or other device. It also could be or have a fixed function device such as a set top box (cable box or satellite box), game box, or a television. The camera(s) 2302 may be wirelessly communicating, or wired to communicate, image data to the logic units 2304. One or more of the cameras may be on moving vehicles such as drones.

In any of these cases, such technology may include a camera such as a digital camera system, a dedicated camera device, web cam, or any other device with a camera, a still camera and so forth for the run-time of the system as well as for model learning and/or image collection for generating predetermined personal image data. The cameras may be RGB cameras or RGB-D cameras, but could be YUV cameras. Thus, in one form, imaging device 2302 may include camera hardware and optics including one or more sensors as well as auto-focus, zoom, aperture, ND-filter, auto-exposure, flash, actuator controls, and so forth. By one form, the cameras may be fixed in certain degrees of freedom, or may be free to move in certain or all directions, as long as the position and optical axis from camera to camera is known so that the cameras can be registered to the same coordinate system.

The logic modules 2304 of the image processing system 2300 may include, or communicate with, an image unit 2306 that performs at least partial processing. Thus, the image unit 2306 may perform pre-processing, decoding, encoding, and/or even post-processing to prepare the image data for transmission, storage, and/or display. It will be appreciated that the pre-processing performed by the image unit 2306 could be modules located on one or each of the cameras, a separate image processing unit 2300, or other location.

In the illustrated example, the logic modules 2304 also may include a player tracking unit 2340, a ball tracking unit 2346, and a ball carrier estimation unit 2332 all as described above already with system 600. The ball carrier estimation unit 2340 may have a run-time unit 2342 and a NN training unit 2344. The run-time unit 2342 may have the field view image generator 614, feature extraction unit 616, single frame estimation unit 618 which operates a CNN 2346, and a multiple frame smoothing unit 620. Other image apps 2323 also may be provided to use the ball carrier estimation for example to generate images to display to users using BTP mode for example. The ball carrier estimation unit 2332 and the other units may store and retrieve relevant ball carrier estimation data form memory store(s) 2314 which may be any practical memory with sufficient capacity whether RAM, non-volatile, or other type of memory.

These units may be operated by, or even entirely or partially located at, processor circuitry 2310 which may form one or more processors such as the Intel Atom, and which may include a dedicated image signal processor (ISP) 2312, to perform many of the operations mentioned herein. The logic modules 2304 may be communicatively coupled to the components of the imaging device 2302 in order to receive raw image data. The image processing system 2300 also may have antenna 2320. In one example implementation, the image processing system 2300 may have at least one processor circuit 2310 communicatively coupled to the display, and at least one memory 2314 communicatively coupled to the processor to perform the operations described herein as explained above.

The image unit 2306, which may have an encoder and decoder, and antenna 2320 may be provided to compress and decompress the image date for transmission to and from other devices that may display or store the images. This may refer to transmission of image data among the cameras, and the logic units 2304. Otherwise, the processed image 2318 may be displayed on the display 2316 or stored in memory 2314 for further processing as described above. As illustrated, any of these components may be capable of communication with one another and/or communication with portions of logic modules 2304 and/or imaging device 2302. Thus, processor(s) or processor circuitry 2310 may be communicatively coupled to both the image devices 2302 and the logic modules 2304 for operating those components. By one approach, although image processing system 2300, as shown in FIG. 23, may include one particular set of unit or actions associated with particular components or modules, these units or actions may be associated with different components or modules than the particular component or module illustrated here.

Figure 24:
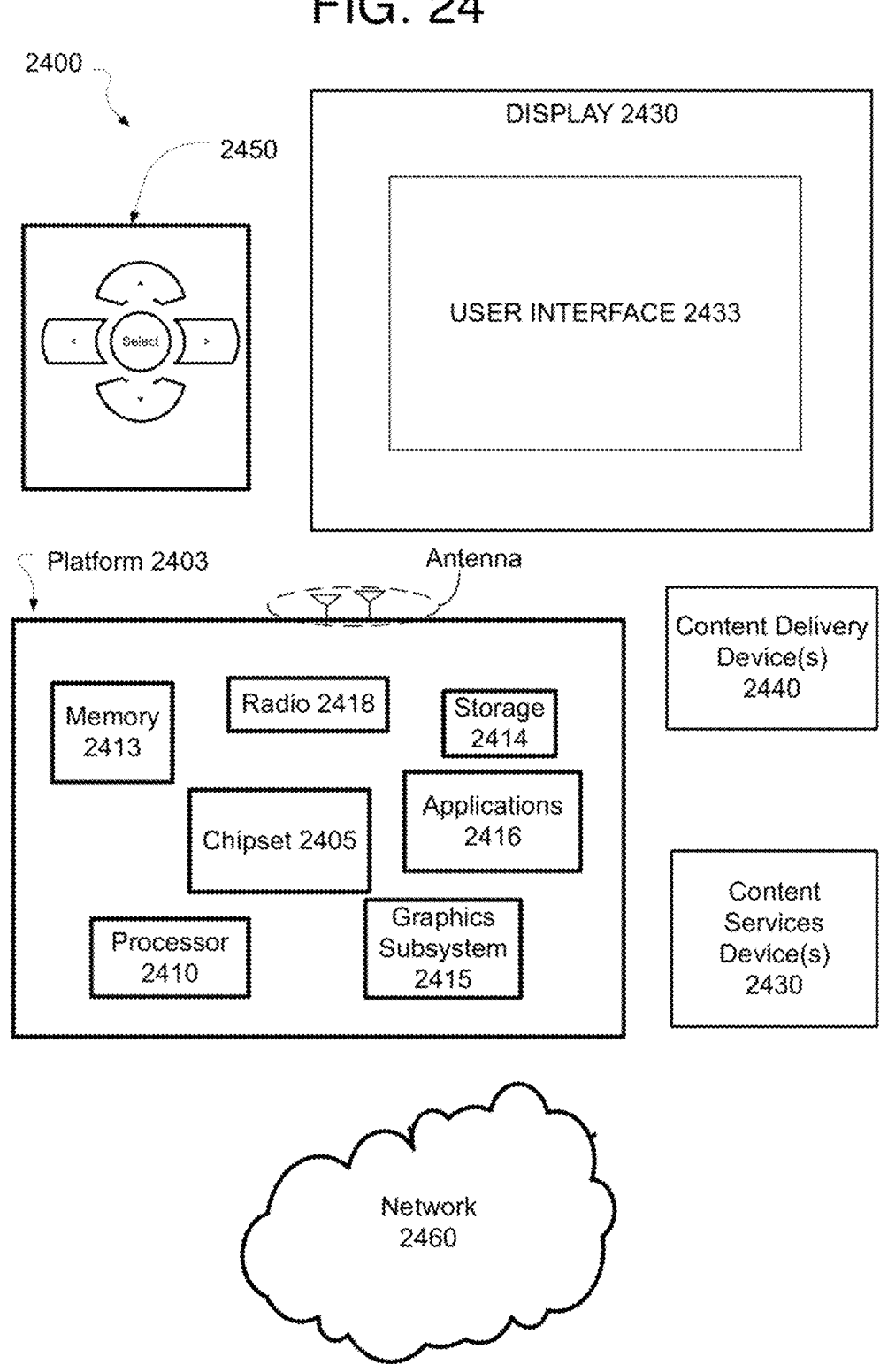
FIG. 24 is an illustrative diagram of another example system.

Referring to FIG. 24, an example system 2400 in accordance with the present disclosure operates one or more aspects of the image processing system described herein. It will be understood from the nature of the system components described below that such components may be associated with, or used to operate, certain part or parts of the image processing systems described above including performance of a camera system operation described above. In various implementations, system 2400 may be a media system although system 2400 is not limited to this context. For example, system 2400 may be incorporated into a digital video camera, mobile device with camera or video functions such as an imaging phone, webcam, personal computer (PC), remote server, laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 2400 includes a platform 2402 coupled to a display 2420. Platform 2402 may receive content from a content device such as content services device(s) 2430 or content delivery device(s) 2440 or other similar content sources. A navigation controller 2450 including one or more navigation features may be used to interact with, for example, platform 2402 and/or display 2420. Each of these components is described in greater detail below.

In various implementations, platform 2402 may include any combination of a chipset 2405, processor 2410, memory 2412, storage 2414, graphics subsystem 2415, applications 2416 and/or radio 2418. Chipset 2405 may provide intercommunication among processor 2410, memory 2412, storage 2414, graphics subsystem 2415, applications 2416 and/or radio 2418. For example, chipset 2405 may include a storage adapter (not depicted) capable of providing intercommunication with storage 2414.

Processor 2410 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 2410 may be dual-core processor(s), dual-core mobile processor(s), and so forth.

Memory 2412 may be implemented as a volatile memory device such as, but not limited to, a Random Access Memory (RAM), Dynamic Random Access Memory (DRAM), or Static RAM (SRAM).

Storage 2414 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 2414 may include technology to increase the storage performance enhanced protection for valuable digital media when multiple hard drives are included, for example.

Graphics subsystem 2415 may perform processing of images such as still or video for display. Graphics subsystem 2415 may be a graphics processing unit (GPU) or a visual processing unit (VPU), for example, and may or may not include an image signal processor (ISP). An analog or digital interface may be used to communicatively couple graphics subsystem 2415 and display 2420. For example, the interface may be any of a High-Definition Multimedia Interface, Display Port, wireless HDMI, and/or wireless HD compliant techniques. Graphics subsystem 2415 may be integrated into processor 2410 or chipset 2405. In some implementations, graphics subsystem 2415 may be a stand-alone card communicatively coupled to chipset 2405.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 2418 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 2418 may operate in accordance with one or more applicable standards in any version.

In various implementations, display 2420 may include any television type monitor or display. Display 2420 may include, for example, a computer display screen, touch screen display, video monitor, television-like device, and/or a television. Display 2420 may be digital and/or analog. In various implementations, display 2420 may be a holographic display. Also, display 2420 may be a transparent surface that may receive a visual projection. Such projections may convey various forms of information, images, and/or objects. For example, such projections may be a visual overlay for a mobile augmented reality (MAR) application. Under the control of one or more software applications 2416, platform 2402 may display user interface 2422 on display 2420.

In various implementations, content services device(s) 2430 may be hosted by any national, international and/or independent service and thus accessible to platform 2402 via the Internet, for example. Content services device(s) 2430 may be coupled to platform 2402 and/or to display 2420. Platform 2402 and/or content services device(s) 2430 may be coupled to a network 2460 to communicate (e.g., send and/or receive) media information to and from network 2460. Content delivery device(s) 2440 also may be coupled to platform 2402 and/or to display 2420.

In various implementations, content services device(s) 2430 may include a cable television box, personal computer, network, telephone, Internet enabled devices or appliance capable of delivering digital information and/or content, and any other similar device capable of unidirectionally or bidirectionally communicating content between content providers and platform 2402 and/display 2420, via network 2460 or directly. It will be appreciated that the content may be communicated unidirectionally and/or bidirectionally to and from any one of the components in system 2400 and a content provider via network 2460. Examples of content may include any media information including, for example, video, music, medical and gaming information, and so forth.

Content services device(s) 2430 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 2402 may receive control signals from navigation controller 2450 having one or more navigation features. The navigation features of controller 2450 may be used to interact with user interface 2422, for example. In implementations, navigation controller 2450 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 2450 may be replicated on a display (e.g., display 2420) by movements of a pointer, cursor, focus ring, or other visual indicators displayed on the display. For example, under the control of software applications 2416, the navigation features located on navigation controller 2450 may be mapped to virtual navigation features displayed on user interface 2422, for example. In implementations, controller 2450 may not be a separate component but may be integrated into platform 2402 and/or display 2420. The present disclosure, however, is not limited to the elements or in the context shown or described herein.

In various implementations, drivers (not shown) may include technology to enable users to instantly turn on and off platform 2402 like a television with the touch of a button after initial boot-up, when enabled, for example. Program logic may allow platform 2402 to stream content to media adaptors or other content services device(s) 2430 or content delivery device(s) 2440 even when the platform is turned "off." In addition, chipset 2405 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 2400 may be integrated. For example, platform 2402 and content services device(s) 2430 may be integrated, or platform 2402 and content delivery device(s) 2440 may be integrated, or platform 2402, content services device(s) 2430, and content delivery device(s) 2440 may be integrated, for example. In various implementations, platform 2402 and display 2420 may be an integrated unit. Display 2420 and content service device(s) 2430 may be integrated, or display 2420 and content delivery device(s) 2440 may be integrated, for example. These examples are not meant to limit the present disclosure.

In various implementations, system 2400 may be implemented as a wireless system, a wired system, or a combination of both. When implemented as a wireless system, system 2400 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 2402 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 24.

Examples of a mobile computing device that may be used to perform the operations mentioned above may include a digital still camera, digital video camera, mobile devices with camera or video functions such as imaging phones, webcam, personal computer (PC), laptop computer, ultra-laptop computer, tablet, touch pad, portable computer, hand-held computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be wont by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

In a first example, a computer-implemented method of image processing, comprising: obtaining 3D location data of athletes and a ball based on images of an athletic event on a field; generating feature vectors of individual players on the field; and automatically estimating a ball carrier position on the field comprising inputting the feature vectors arranged into multiple channels and input into a convolutional neural network that outputs a ball carrier probability map indicating a likely location of the ball carrier on the field.

In a second example, and further to the first example, wherein the feature vectors are arranged into channels so that each channel has a different one or more features than other channels.

In a third example, and further to the second example, wherein the channels are each the size of a player position grid at least generally being the size of the field, wherein players are individually assigned to grid spaces of the grid.

In a fourth example, and further to any of the first to third examples, wherein the feature vectors comprise data of 3D position of the player.

In a fifth example, and further to any of the first to fourth examples, wherein the feature vectors comprise data of the velocity or direction of movement or both of the player.

In a sixth example, and further to any of the first to fifth examples, wherein the feature vectors comprise data of the orientation of the player.

In a seventh example, and further to any of the first to sixth examples, wherein the player is a current player, and wherein the feature vectors comprise a count of players within a predetermined grid space neighborhood of the current player.

In an eighth example, a computer-implemented system comprising: memory at least storing 3D model data of a scene generated from multiple cameras of an athletic event using a ball; and processor circuitry communicatively coupled to the memory and being arranged to operate by: generating 3D location data of athletes and a ball from images of an athletic event on a field; generating feature vectors of individual players on the field; and automatically estimating a ball carrier position on the field comprising inputting the feature vectors arranged into multiple channels and input into a convolutional neural network that outputs a ball carrier probability map indicating a likely location of the ball carrier on the field.

In a ninth example, and further to the eighth example, wherein the feature vectors comprise data related to player attributes, movement and location of the player and a count of neighbor players, a ball position relative to the player, and multiple frame-related data.

In a tenth example, and further to the ninth example, wherein the feature vectors comprise the amount of other neighbor players in neighbor grid positions relative to that of the player.

In an eleventh example, and further to the tenth example, wherein the player is a current player, and wherein the neighbor players are within a 5×5 grid space block with the current player at the center of the block.

In a twelfth example, and further to the tenth example, wherein feature vectors comprise a count of neighbor players on the same team as the current player and a count of players not on the same team as the current player.

In a thirteenth example, at least one non-transitory article having at least one computer readable medium comprising instructions that in response to being executed on a computing device, causes the computing device to operate by: obtaining 3D location data of athletes and a ball from images of an athletic event on a field; generating feature vectors of individual players on the field; and automatically estimating a ball carrier position on the field comprising inputting the feature vectors arranged into multiple channels and input into a convolutional neural network that outputs a ball carrier probability map indicating a likely location of the ball carrier on the field.

In a fourteenth example, and further to the thirteenth example, wherein the feature vectors comprise multi-frame related data indicating differences in player or ball or both features from one frame to another frame.

In a fifteenth example, and further to the thirteenth or fourteenth example, wherein the feature vectors are arranged into channels with each channel being of a different one or more features than other channels of the feature vector.

In a sixteenth example, and further to any of the thirteenth to fifteenth examples, wherein the instructions cause the computing device to operate by determining candidate players comprising using the ball carrier probability map to determine the player with the highest single frame confidence and other candidate players that are located within a predetermined grid space neighborhood of the player with the highest single frame confidence.

In a seventeenth example, and further to the sixteenth example, wherein the instructions cause the computing device to operate by determining the highest multi-frame confidence among the player with the highest single frame confidence and the other candidate players by combining single frame confidences of the player with the highest single frame confidence and the other candidate players.

In an eighteenth example, and further to any of the thirteenth to seventeenth examples, wherein the feature vectors comprise data of at least a player jersey number, a current player motion and position, amount of neighbor players relative to a current player position, a ball position, and at least one difference in at least one ball or player or both feature from one frame to another frame.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method comprising:
   obtaining three-dimensional (3D) location data of individual players and a ball based on images of an athletic event on a field;
   generating feature vectors corresponding respectively to the individual players on the field, the feature vectors including amounts of other individual players in neighbor grid positions relative to respective ones of the individual players, a first one of the feature vectors for a first one of the individual players including an amount of the other individual players in a five-by-five space grid with the first one of the individual players at a center of the five-by-five space grid; and
   automatically estimating a ball carrier position on the field based on inputting the feature vectors into a convolutional neural network, the convolutional neural network trained to output a ball carrier probability map including probabilities of a ball carrier being at different locations on the field.

2. The method of claim 1, wherein the feature vectors are arranged into channels having different one or more features than other channels.

3. The method of claim 2, wherein the channels have a size corresponding to a player position grid, the player position grid corresponding to a size of the field, and the individual players are assigned to grid spaces of the player position grid.

4. The method of claim 1, wherein the feature vectors include 3D positions of the individual players.

5. The method of claim 1, wherein the feature vectors include at least one of velocities or directions of movement of the individual players.

6. The method of claim 1, wherein the feature vectors include orientations of the individual players.

7. A computer-implemented system comprising:
   memory storing at least images of an athletic event on a field, the images from multiple cameras;
   instructions; and
   processor circuitry communicatively coupled to the memory, the processor circuitry to be programmed based on the instructions to:
      generate three-dimensional (3D) location data of individual players and a ball from images;
      generate feature vectors corresponding respectively to the individual players on the field, the feature vectors including amounts of other individual players in neighbor grid positions relative to respective ones of the individual players, a first one of the feature vectors for a first one of the individual players including an amount of the other individual players in a five-by-five space grid with the first one of the individual players at a center of the five-by-five space grid; and
      input the feature vectors into a convolutional neural network to estimate a position of a ball carrier on the field, the convolutional neural network trained to output a ball carrier probability map including probabilities of the ball carrier being at different locations on the field.

8. The system of claim 7, wherein the feature vectors include data related to player attributes, movement and location of the players, a ball position relative to the players, and multiple frame-related data.

9. The system of claim 7, wherein the first one of the feature vectors includes a count of neighbor players on a same team as the first one of the individual players and a count of players not on the same team as the first one of the individual players.

10. At least one non-transitory computer readable medium comprising instructions to cause a computing device to at least:

obtain three-dimensional (3D) location data of individual players and a ball from images of an athletic event on a field;

generate feature vectors corresponding respectively to the individual players on the field, respective ones of the feature vectors including an amount of the other individual players in a five-by-five space grid with the corresponding one of the individual players at a center of the five-by-five space grid; and input the feature vectors into a convolutional neural network to estimate a position of a ball carrier on the field, the convolutional neural network trained to output a ball carrier probability map including probabilities of the ball carrier being at different locations on the field.

11. The non-transitory computer readable medium of claim 10, wherein the feature vectors comprise multi-frame related data indicating differences from one frame to another frame.

12. The non-transitory computer readable medium of claim 10, wherein the feature vectors are arranged into channels having different one or more features than other channels.

13. The non-transitory computer readable medium of claim 10, wherein the instructions are to cause the computing device to determine candidate players based on the ball carrier probability map.

14. The non-transitory computer readable medium of claim 10, wherein the feature vectors include at least one of velocities or directions of movement of the individual players.

15. The non-transitory computer readable medium of claim 10, wherein the feature vectors include orientations of the individual players.

16. The non-transitory computer readable medium of claim 10, wherein the feature vectors include at least one of a player jersey number, player motion and position, a ball position, or at least one difference in at least one of the ball or at least one player from one frame to another frame.

\*   \*   \*   \*   \*